United States Patent
Lepley

(10) Patent No.: US 6,738,244 B1
(45) Date of Patent: May 18, 2004

(54) ANNUNCIATOR

(75) Inventor: Joseph M. Lepley, Girard, OH (US)

(73) Assignee: Altronic, Inc., Girard, OH (US)

( * ) Notice: Subject to any disclaimer, the term of this patent is extended or adjusted under 35 U.S.C. 154(b) by 150 days.

(21) Appl. No.: 10/047,702

(22) Filed: Jan. 15, 2002

(51) Int. Cl.$^7$ .............................. H02H 3/18; H02J 7/00
(52) U.S. Cl. .......................................... 361/78; 307/66
(58) Field of Search ............................. 307/48, 56, 64, 307/66, 72–75, 85, 86; 361/42, 45, 78, 79, 86–88, 93.1

(56) References Cited

U.S. PATENT DOCUMENTS

| | | | |
|---|---|---|---|
| 4,181,883 A | 1/1980 | Beeghly et al. ............. | 324/166 |
| 4,336,463 A | 6/1982 | Beeghly ...................... | 307/66 |
| 4,467,144 A * | 8/1984 | Wilkerson et al. ..... | 379/217.01 |
| 5,563,456 A | 10/1996 | Berger .......................... | 307/66 |
| 6,144,116 A | 11/2000 | Berger et al. ............... | 307/116 |

OTHER PUBLICATIONS

"Operating Manual FlexiGuard safety control System", AMOT Controls, Form 1081, Rev. 5, 03–94, pp. 1–66.

* cited by examiner

*Primary Examiner*—Matthew V. Nguyen
(74) *Attorney, Agent, or Firm*—Webb Ziesenheim Logsdon Orkin & Hanson, P.C.

(57) ABSTRACT

An annunciator comprises an annunciation and shutdown circuit having input terminals for a first power supply and input terminals for a second power supply. The first and second power supplies are connected to supply power in parallel with each other to the annunciation and shutdown circuit. A logic means responds to a fault signal causing the annunciation and shutdown circuit to switch to low power mode upon sensing that a fault signal has occurred.

9 Claims, 4 Drawing Sheets

ANNUNCIATOR

BACKGROUND OF THE INVENTION

As annunciators for remotely stationed internal combustion engines become more and more sophisticated, the management of power for activating annunciator circuits becomes more demanding. Existing annunciators are powered from the capacitive discharge (CD) ignition or a magnetic pickup from a fly wheel magnet, for example, from intermittent sources, such as photoelectric generators and from long-life batteries. The distribution of power from these sources to maximize battery life has already been considered. See, for example, U.S. Pat. Nos. 4,181,883; 4,336,463; 5,563,456; and 6,144,116.

SUMMARY OF THE INVENTION

Briefly, according to the present invention, there is provided an annunciator for an internal combustion engine comprising annunciator and shutdown circuits. The annunciator has input terminals for being powered by first and second power supplies, the second power supply being a long-life battery power supply. The annunciator comprises sensor input circuits sensing electrically detected conditions and generating fault signals in response thereto, a digital display, and switches for outputting a shutdown signal. At the heart of the annunciator and shutdown circuit is a logic device including a programmed microcontroller, which, in response to fault signals generated by the sensor inputs, causes output of a shutdown signal through the switches. The logic device is also configured to cause a digital display to display fault conditions. The annunciator and shutdown circuit is configured into normal and low power modes. In a normal mode, the entire circuit is powered. In the low power mode, the digital display and only portions of the logic device are powered. The logic device is designed to respond to fault signals causing the annunciator and shutdown circuit to switch to the low power mode upon sensing a fault signal has occurred.

BRIEF DESCRIPTION OF THE DRAWINGS

Further features and other objects and advantages of the present invention will become clear from the following detailed description made with reference to the drawings in which.

DESCRIPTION OF THE PREFERRED EMBODIMENTS

Figure 1:
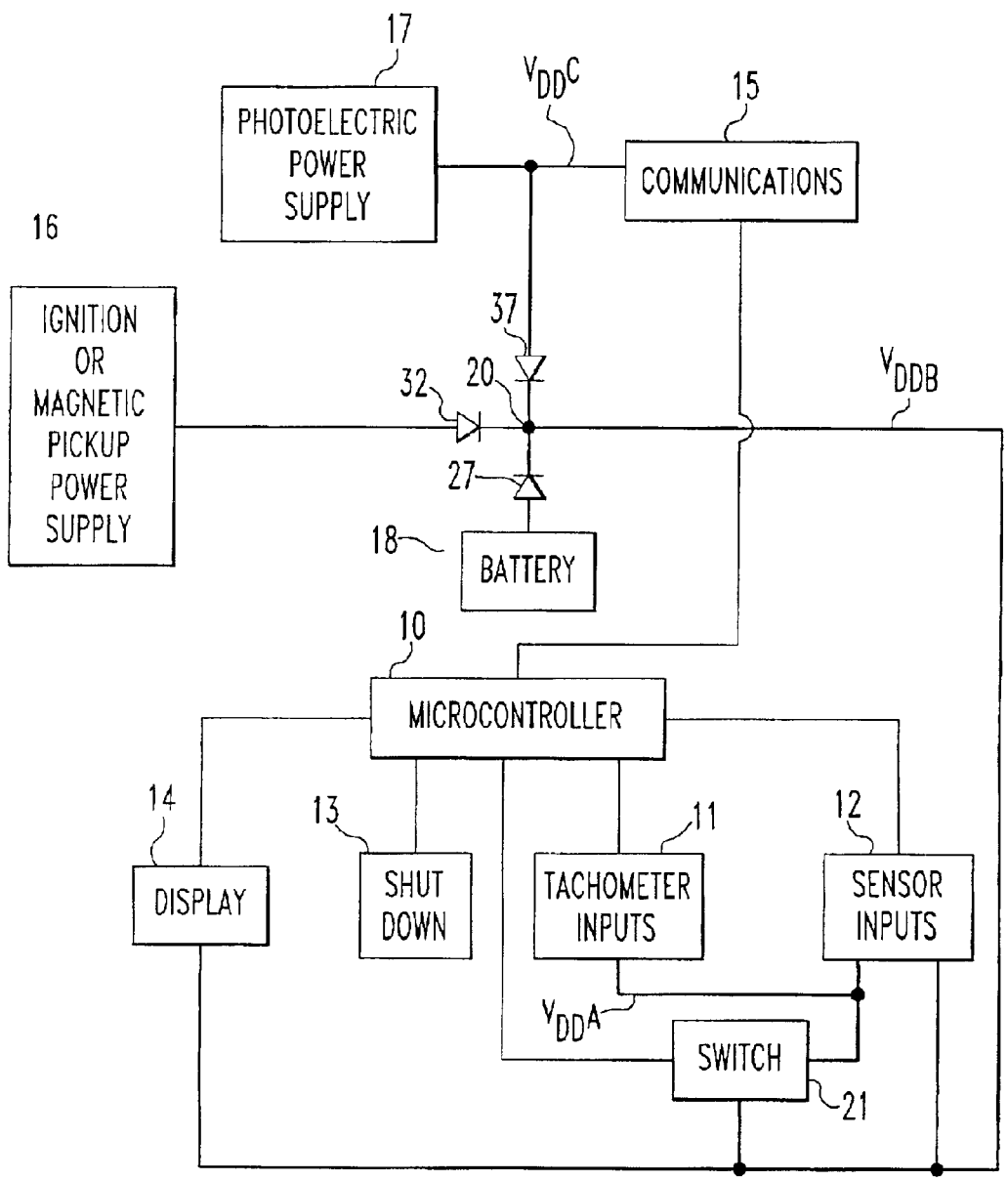
FIG. 1 is an overall schematic of an annunciator according to the present invention.

Referring to FIG. 1, there is shown a schematic of an annunciator circuit according to a preferred embodiment of the present invention. The heavier lines connecting boxes representing various circuit elements are power lines. The lighter lines are data and control lines, not all of which are illustrated.

At the heart of the annunciator is a program microcontroller 10 with on-board program memory. The data inputs to the microcontroller comprise a tachometer input circuit 11 and sensor input circuit 12. The data outputs from the microprocessor comprise outputs to a shutdown circuit 13, outputs to a display 14, and, optionally, communication outputs to a communication circuit 15. Each is described in more detail hereafter.

Three power sources provide electric power to the microcontroller 10 and associated circuits: a secondary power source 16 that depends upon the running of an internal combustion engine, such as a CD ignition or magnetic pickup power source, a tertiary intermittent power source 17, such as a photoelectric power source, and a primary power source 18 comprising a long-life battery. The three power sources 16, 17, and 18 are connected through diodes to junction 20. The secondary and tertiary power sources 16 and 17 are regulated to provide approximately 5 volts output. The battery 18 is chosen to have a lower voltage output, say 3.6 volts. If either the secondary or tertiary supplies are available, the battery will not supply power and will not be drained down.

Without the secondary and tertiary power sources, the battery life achieved by the various power saving techniques described hereafter would be approximately 24,000 hours or three years. Assuming the tertiary power source 17 is available 50% of the time, the battery life is extended to six years. Assuming the secondary power source is available 80% of the time, the battery life is extended to five times its normal life. As a practical matter, battery life projections in excess often years are unpredictable.

The communications option 15 comprises its own microprocessor or microcontroller that is clocked by a crystal oscillator to enable RS232 and/or RS485 outputs. Since the power consumption for the communication option is substantial, it is only powered by the tertiary power supply and never by the battery or primary power supply. Thus, since the tertiary power supply may only be available when the sun is shining, communications may be available in the daytime only.

A feature of the present invention is the management of power used by the tachometer inputs 11, display 14, and sensor inputs 12 in response to a fault condition sensed by the microcontroller 10. The sensors and tachometer inputs are powered through power shutoff switch 21, which can be activated by an output signal from the microcontroller 10. For example, after shutdown, there is no need to power the tachometer circuit at all. Hence, the power shutoff switch 21 cuts off power to the tachometer input circuit at shutdown.

The sensor inputs 12 comprise a plurality of normally open, normally closed digital inputs or analog inputs. Only the sensors being polled are powered during operation when the internal combustion engine is operating. Of course, at this time, the secondary power source is available. However, after shutdown, power is conserved by only powering sensors during polling and only polling those sensors which are significant after shutdown. Any number of inputs, such as status of apparatus driven by the remote internal combustion engine, need not be polled after shutdown. After shutdown, the display 14 is refreshed at much longer intervals as the conditions being monitored are not changing rapidly. Hence, after a fault signal, the microcontroller writes to the display at less frequent intervals saving power.

Referring again to FIG. 1, the output from the tertiary power supply is labeled $V_{DD}^C$. The output from junction 20 supplied by the primary, secondary, and tertiary power supplies is labeled $V_{DD}^B$, and the output from the power shutoff switch 21 is labeled $V_{DD}^A$.

Figure 2:
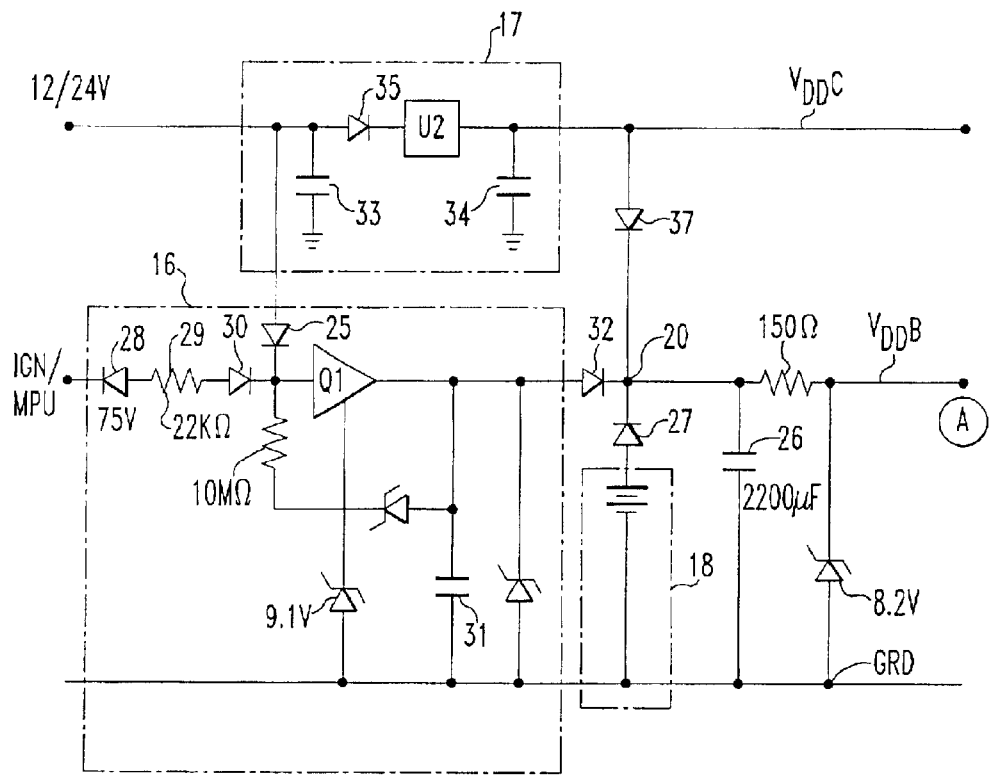
FIG. 2 is a more detailed electrical schematic of the power supply portion of the annunciator according to the present invention.

Referring to FIG. 2, there is shown a more detailed schematic of the primary, secondary, and tertiary power sources. All three power sources are connected in parallel through diodes to junction 20. Hence, no power supply can drain another. All three power supplies charge a 2,200 microfarad capacitor so that even if all three power supplies fail at once, the shutdown process will be monitored. The outputs $V_{DD}^B$ from the junction 20 are applied to the annunciator and shutdown circuit at terminal A.

The primary power supply 18 is a long-life 3.6 volt lithium battery and diode 27.

The secondary power supply 16 is illustrated for use with a capacitive discharge ignition. The CD ignition pulse is passed to regulator Q1 through Zenor diode 28, resistor 29, and diode 30. The output of voltage regulator Q1 is smoothed by a 15 microfarad capacitor 31 and applied to junction 20 through diode 32. An alternate source of power to Q1 is from the tertiary power source through diode 25.

The tertiary power supply 17 would comprise, for example, a photodiode array. The 12/24 volt direct current input is regulated to 5 volts by capacitors 33, 34, diode 35, and regulator U2. The regulated output of the tertiary power supply $V_{DD}^C$ is supplied to the communications option at terminal B and/or to junction 20 through diode 37.

Figure 3:
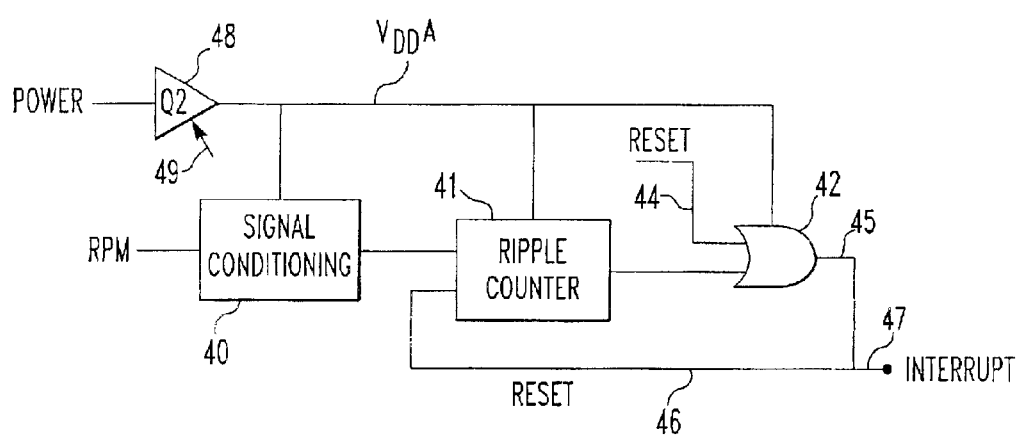
FIG. 3 is an electrical schematic illustrating a tachometer input circuit useful for the present invention.

Referring to FIG. 3, there is shown a block diagram illustration of the tachometer input circuit. It comprises a signal conditioning section that compares the RPM pickup pulse to a threshold level and passes signals exceeding the threshold to a shift register. Each time the threshold is exceeded, the shift register changes state (low/high or high/low). The output from the signal conditioning section is passed to the ripple counter 41. The carryout 43 of the ripple counter 41 is supplied to an EXCLUSIVE OR gate 42. The other input to the EXCLUSIVE OR gate is a reset signal 44 output from the microcontroller. The output on line 45 of the EXCLUSIVE OR gate is both a reset signal on line 46 for the ripple counter 41 and an interrupt signal on line 47 to the microcontroller. A gate 48 controls the power to the signal conditioning section, ripple counter, AND EXCLUSIVE OR gate. The gate 48 is controlled by an output from the microcontroller on line 49 which stops power drain in the tachometer input circuit after shutdown.

Figure 4:
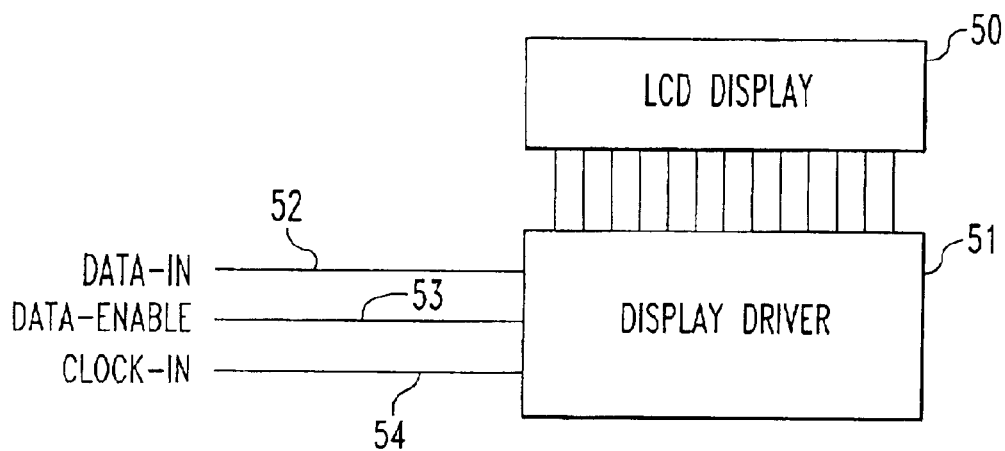
FIG. 4 is a schematic diagram showing a display driver, and display circuit useful for the present invention.

Referring to FIG. 4, the display 14 is comprised of a plural digit seven-segment liquid crystal display 50 and a display driver 51 that converts a serial input signal on the data in line 52 to parallel outputs. Additional outputs to the display driver are the clock-in on line 54 and the data enable on line 53. These integrated circuits remain powered even after shutdown. However, by reducing the refresh rate controlled by the signals on lines 52, 53, and 54, which are all individually controlled by output connections on the microcontroller, the power consumption is substantially reduced after shutdown.

Figure 5:
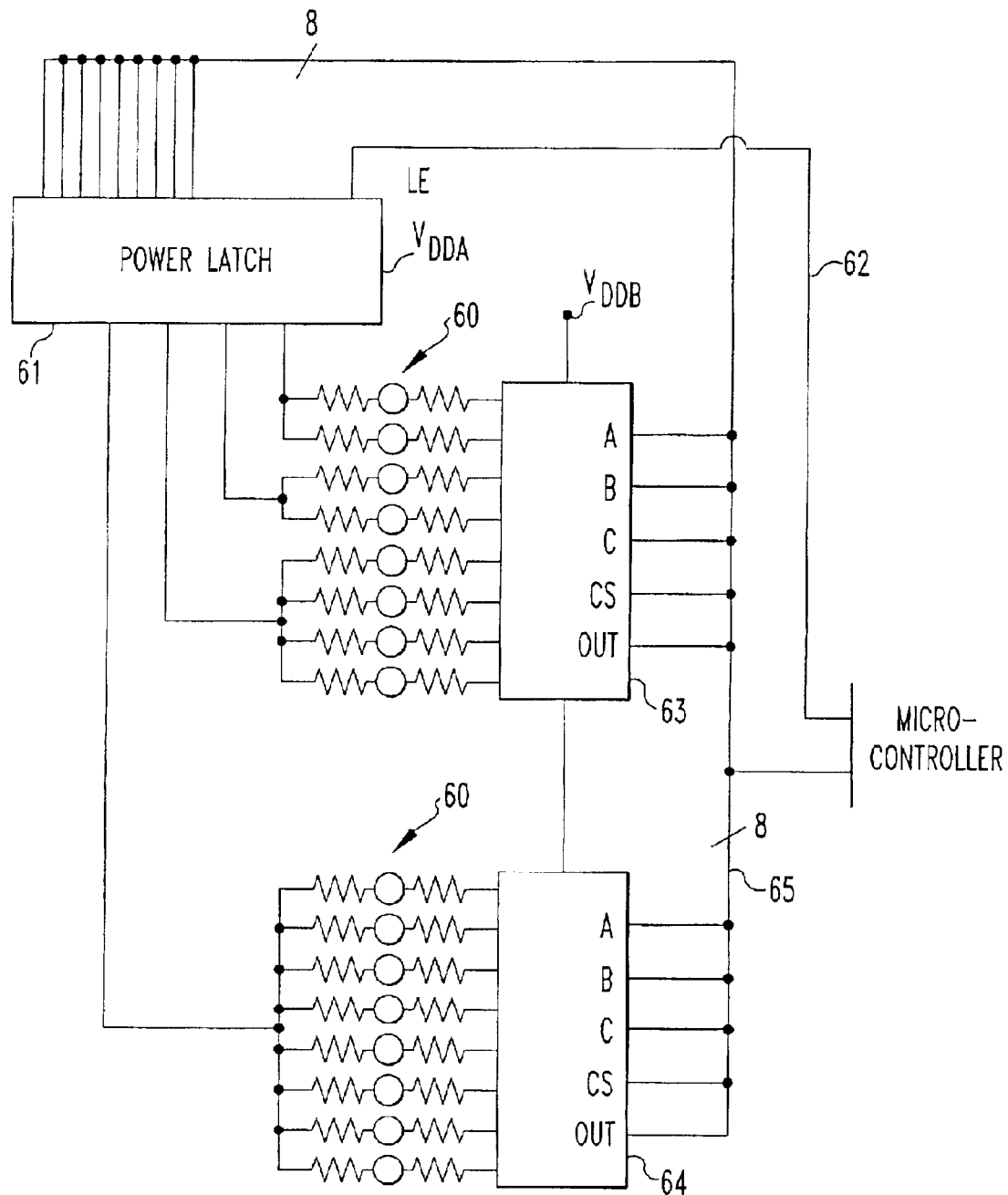
FIG. 5 is a schematic diagram showing a plurality of sensor switches and the powering and polling circuits for the sensor switches useful for the present invention.

Referring to FIG. 5, the sensor circuit comprises a plurality of sensor switches 60. The sensor switches may be normally open or normally closed. The sensor switches are powered by power latch 61. The outputs of the latch 61 are selected by signals on the data bus 65 and latch enable line 62. Sensors can be powered in banks. As shown in FIG. 5, the sensors are connected to the power latch 61 in two banks of two sensors, one bank of four sensors and one bank of eight sensors. The sensors are polled through eight-channel analog multiplexer chips 63 and 64. The multiplexer chips poll the sensor switches through the chip select CS input and the select inputs A, B, C. The condition of a polled switch is output on the OUT line, wherein high=safe and ground=fault. The multiplexer chips 63 and 64 are powered by source $V_{DD}^B$ which is shut off at the time of a fault signal so as not to draw power after shutdown. The power latch 61, however, is powered by source $V_{DD}^A$ which continues to apply a voltage after shutdown. However, when the latch LE is disabled, no power is drained by the chip. Indeed, if the power was not applied from some source, the chip would scavage power from the control line 65 which is connected to the microcontroller. The microcontroller remains powered by $V_{DD}^A$ during shutdown.

Figure 6:
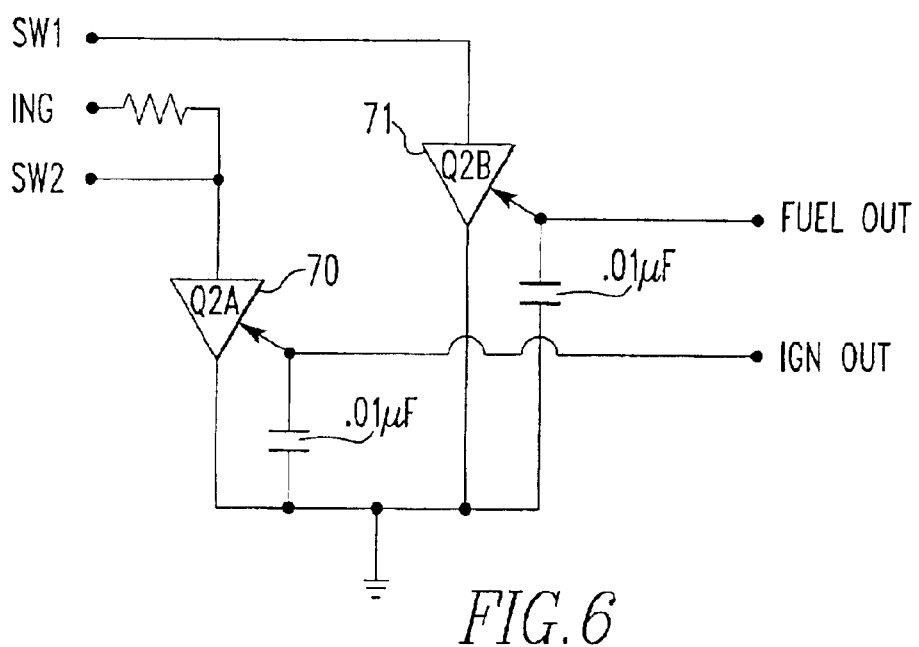
FIG. 6 is a shutdown circuit useful for the present invention.

Referring to FIG. 6, the shutdown circuit comprises two FET switches 70 and 71 that are controlled by FUEL OUT and IGNITION OUT control lines controlled by the microcontroller. A voltage signal applied to the gate of the FET switch grounds the ignition and shuts off the fuel valve.

A unique feature of the present invention is that switch to the low power mode is based upon an output from the microcontroller and is not simply the result of a power source failure. Hence, the switch to the low power mode can have a programmed delay to ensure that shut down is orderly and that conditions are monitored during shut down. Moreover, loss of the secondary and tertiary power supplies does not require immediate shut down and switch to the low power mode. As long as the engine is still running safely, the annunciator may be left in the normal mode and run off the battery while maintaining safe operation.

Having thus defined my invention with the detail and particularity required by the Patent Laws, what is desired protected by Letters Patent is set forth in the following claims.

I claim:

1. An annunciator comprising an annunciation and shutdown circuit having input terminals for a first power supply and input terminals for a second power supply, the second power supply being a battery power supply;

said annunciation and shutdown circuit comprising:
  i) sensor input circuits sensing electrically detected conditions and generating catastrophic and non-catastrophic condition signals in response thereto;
  ii) digital display means;
  iii) shutdown means for outputting a shutdown signal; and
  iv) logic means comprising a microprocessor, sensor input circuit, polling circuits controlled by the microprocessor, and a power mode switch controlled by the microprocessor, said logic means arranged to respond to the fault signals generated by the sensor inputs and causing the shutdown means to output a shutdown signal in response to a catastrophic condition signal, said logic means also configured to cause the digital display means to display catastrophic and noncatastrophic conditions;

said first and second power supplies connected to supply power in parallel with each other such that either alone can power the entire annunciation and shutdown circuit;

said power mode switch arranged to configure the annunciation and shutdown circuit into normal and low power modes, said normal power mode powering the entire circuit and said low power mode powering the microprocessor, selected input polling circuits and digital display means;

said logic means arranged to respond to a catastrophic condition signal causing the annunciation and shutdown circuit to switch to low power mode upon sensing that a catastrophic condition signal has occurred.

2. An annunciator comprising an annunciation and shutdown circuit having two power supplies, a first external power supply of an interruptible nature and a second internal supply consisting of a non-interruptible primary battery;

said annunciation and shutdown circuit comprising:
  i) sensor input circuits sensing electrically detected conditions and generating catastrophic and non-catastrophic condition signals in response thereto;
  ii) digital display means;
  iii) shutdown means for outputting a shutdown signal; and
  iv) logic means arranged to respond to the condition signals generated by the sensor inputs and causing the shutdown means to output a shutdown signal in response to a catastrophic condition, said logic means also configured to cause the digital display means to display catastrophic and noncatastrophic conditions;

said first and second power supplies connected to supply power in parallel with each other to the annunciation and shutdown circuit such that the first power supply supplies power only when it is greater in voltage than the second supply, whereby the service life of said second supply is extended, and such that either alone can power the entire annunciation and shutdown circuit;

said annunciation and shutdown circuit configured for operation from either supply in normal and low power modes, said normal power mode powering the entire circuit and the input sensing means and said low power mode powering the display and a portion of the logic means;

said logic means arranged to respond to a catastrophic condition signal while powered by either said first or second power supplies causing the annunciation and shutdown circuit to switch to low power mode, thereby extending the service life of said second supply.

3. The annunciator of claim 1 or 2, wherein the first power supply is a capacitor discharge ignition system power supply.

4. The annunciator of claim 1 or 2, wherein the first power supply is a magnetic pickup.

5. The annunciator of claim 1 or 2, wherein the first power supply is a source of DC power.

6. The annunciator of claim 2, wherein the annunciator provides for two parallel connected external sources of power, where either or both function as the first power supply.

7. The annunciator of claim 1 or 2, wherein the logic means comprises a power latch for the sensor input circuits, and multiplexer chips for polling the sensor circuits.

8. The annunciator of claim 7, wherein in the low power mode, the microprocessor is powered.

9. The annunciator of claim 7, wherein in the low power mode, the microprocessor and multiplexer chips are provided.

* * * * *